United States Patent
Van Hekken et al.

(10) Patent No.: US 6,258,391 B1
(45) Date of Patent: Jul. 10, 2001

(54) APPLICATION OF HIGH PRESSURE CARBON DIOXIDE FOR ACCELERATED MANUFACTURE OF HARD CHEESE

(75) Inventors: Diane L. Van Hekken, Blue Bell, PA (US); Virginia Harris Holsinger, Arlington, VA (US); Peggy M. Tomasula, Titusville, NJ (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 09/428,096

(22) Filed: Oct. 27, 1999

(51) Int. Cl.$^7$ ........................................... A23L 19/05
(52) U.S. Cl. .............................. 426/36; 426/42; 426/475; 426/491; 426/582
(58) Field of Search ................................ 426/36, 42, 491, 426/475, 582

(56) References Cited

U.S. PATENT DOCUMENTS

| | | |
|---|---|---|
| 5,006,349 | 4/1991 | Dahlstrom et al. . |
| 5,432,265 | 7/1995 | Tomasula ............................. 530/361 |

FOREIGN PATENT DOCUMENTS

99/20120 * 4/2000 (WO) .

OTHER PUBLICATIONS

P.J. Jordan et al., "Casein Precipitation Using High Pressure Carbon Dioxide" New Zealand Journal of Diary Science and Technology, 22:247–256 (1987).

P.M. Tomasula et al., "a Continuous Process for Casein Production Using High–pressure Carbon Dioxide", Journal of Food Engineering 33:405–419 (1997).

P.M. Tomasula et al., "Preparation of Casein Using Carbon Dioxide", Journal Dairy Science 78:506–514 (1995).

A. Montilla, "Manufacture of cheese made from $CO_2$–treated milk", Z.Lebensm Unters Forsch 200:289–292 (1995).

R. Uceda et al., "Characteristics of Manchego cheese manufactured from ewe raw milk preserved by addition of carbon dioxide or by activation of the lactoperoxidase system", Milchwissenschaft 49 (12) pp. 678–683 (1994).

M.M. Calvo et al., "Rennet—Clotting Properties and Starter Activity on Milk Acidified with Carbon Dioxide", Journal of Food Protection, vol. 56, No. 12, pp. 1073–1076 (1993).

A. Desobry–Banon et al., "Dairy Foods—Study of Acid and Rennet Coagulation of High Pressurized Milk", Journal of Dairy Science 77:3267–3274 (1994).

K. Ohmiya et al., "Effect of Pressure on the Association States of Enzyme–treated Caseins", Agric. Biol. Chem. 53(1), pp. 1–7 (1989).

K. Ohmiya et al., "Milk Curdling by Rennet under High Pressure", Journal of Food Science vol. 52, No. 1, pp. 84–87 (1987).

T. McCarney et al., "Effect of carbonation of milk on Cheddar cheese yield and quality", Milchwissenschaft 50 (12) pp. 670–674 (1995).

* cited by examiner

*Primary Examiner*—Helen Pratt
(74) *Attorney, Agent, or Firm*—M. Howard Silverstein; Curtis P. Ribando; John D. Fado

(57) ABSTRACT

In the manufacture of hard cheese, cheese milk is treated with high pressure $CO_2$ to accelerate the precipitation of casein and thereby promote the rapid formation of curd. Curd can be produced by this process in a period of a few minutes without adverse affects on the rennet or starter culture. The high pressure $CO_2$ treatment of cheese milk can substantially increase the daily curd yields and plant throughput, thereby significantly reducing processing costs.

9 Claims, 2 Drawing Sheets

APPLICATION OF HIGH PRESSURE CARBON DIOXIDE FOR ACCELERATED MANUFACTURE OF HARD CHEESE

BACKGROUND OF THE INVENTION

1. Field of the Invention

The manufacture of hard cheese is a long and tedious process, beginning with the inoculation with starter culture into raw or pasteurized standardized milk to the final stages of salting, packaging, and aging. Coagulation of milk and curd development are critical and time consuming steps in cheese manufacture. This invention relates to accelerating the manufacture of hard cheese by subjecting milk inoculated with rennet and starter culture microorganisms to high pressure carbon dioxide.

2. Description of the Prior Art

Over several millennia of cheesemaking, advances in the art have been incremental and relatively few. Traditionally, cheese was made from naturally-soured milk. Rennet obtained from calf stomach vells was used to generate the milk curd which was later separated from the whey. Beginning in the late nineteenth century, the concept of replacing soured milk with pure microbial lactic cultures was recognized as a means of better controlling the cheese characteristics, particularly the flavor and texture. Other improvements in cheese making included pasteurization of the milk and standardization of rennet by refinement of its extraction from calf vells. The latter modification resulted in a more uniform quality of curd and reduced curd contamination by micro-organisms associated with the vells.

In the modern process for making hard cheese, standardized pasteurized "cheese" milk, a starter culture, and rennet are combined and then heated to produce a coagulum. This coagulum is cut and heated further to separate the curd from the whey. The curd is then recovered and is subsequently washed, salted, packaged, and appropriately aged.

Rennet, containing the enzyme chymosin and/or pepsin and obtained from animal, plant, or microbial sources, is recognized as having multifunctional roles in the cheesemaking process; it is responsible for proteolysis. Initially, rennet destabilizes the casein micelles by cleaving a specific site in the protein chain of k-casein; this is followed by coagulation in about 30 minutes. During aging, rennet and other enzymes from starter cultures continue to proteolize the proteins to peptides that impart characteristic flavor to cheeses. Proteolysis also releases fat globules from the curd matrix, making them available to the action of lipases.

Lactic acid starter cultures play important and complex roles in cheesemaking. Of course, their principal function is the production of lactic acids that precipitate the casein. In some modern processes, precipitation is accelerated by the addition of acids, such as hydrochloric or sulfuric acid. Casein precipitates at the isoelectric point of pH 4.6 and approximately 20° C., conditions at which the negative charges on the surface of the casein micelles are neutralized. Other environmental factors such as ionic strength, dielectric properties of the solvent, and temperature also affect the solubility of proteins and can be used to advantage for protein precipitation.

Jordan et al. [N.Z.J. Dairy Sci. Technol., 22:247–256, (1987)] have shown that it is possible to precipitate casein by dissolution of carbon dioxide in milk. The reversible reaction for the dissolution of carbon dioxide in water or milk is expressed as follows:

$$CO_2 + H_2O \rightleftharpoons HCO_3^- + H^+$$

Increasing the pressure of carbon dioxide injected into the milk results in an increased production of $H^+$ thereby lowering the pH and causing coagulation of the protein.

Tomasula et al. [J. Dairy Sci., 78:506–514, (1995)] reported that when $CO_2$ was sparged through the milk (maintained at 38° C.) to a pressure of 5.52 MPa and held for 5 min, the separated whey had a pH of 6.0 and the resulting casein mass was granular, moist, friable, and contained higher levels of solids, ash, and calcium. Indications from carbon milk studies suggest that this treatment would have a strong antimicrobial effect on psychrotrophic bacteria in the milk [Amigo et al., Z. Lebensm. Unters. Forsch., 200:293–296 (1995); King and Mabbit, J. Dairy Res., 49:439–447 (1982); Montilla et al., Z. Lebensm. Unters. Forsch., 200:289–292, (1995); Raus-Madicdo et al., J. Food Prot., 59:502–508, (1996); Roberts and Torrey, J. Dairy Sci., 71:52–60, (1998)]. Whether or not the $CO_2$ processing environment would be detrimental to the facultative anaerobic lactic acid bacteria commonly used in cheesemaking or to the multifunctional roles of rennet is less certain.

High hydrostatic pressure is known to have severe effects on microorganisms [Hoover et al., Food Technology, March 1989, pp. 99–107]; cell morphology was affected at pressures as low as 0.6 MPa, hydrophobic interactions were disrupted at pressures below 100 MPa, and biochemical reactions and membrane integrity were altered at pressures above 100 MPa. Compared to salt buffer or meat, milk provided some protection to microorganisms when exposed to high pressure [Styles et al., J. Food Sci 56:1404–1407 (1991); Patterson et al., J. Food Protection 58:524–529 (1995); Gervila et al., J. Food Protection 60:33–37 (1997)]. When inoculated into milk, Vibrio parahaemolyticus was inactivated at pressures over 165 MPa [Styles et al. (1991)], Listeria monocytogenes was killed at pressures over 300 MPa [Styles et al. (1991)], and Listeria innocua was reduced 7 to 8 log units at pressures over 450 MPa [Gervila et al. (1997)].

The effects of high pressure on milk proteins and enzymes essential to cheesemaking has been more varied. Beta-lactoglobulin was denatured at pressures over 100 MPa [Lopezfandino et al., J. Dairy Sci. 79:929–936, (1996)] while rennet and caseins were not denatured at pressures up to 130 MPa [Ohimiya et al., J. Food Sci., 52:84–87, (1987)] and the activity of plasmin or the structures of alpha-lactalbumin or bovine serum albumin were not altered at pressures up to 4,000 MPa [Ohimiya et al., Agric. Biol. Chem., 53:1–7. (1989)]. Pressures between 130 and 300 MPa delayed the aggregation of casein micelles [Ohimiya et al., (1987)], shortened the time for curd formation [Lopezfandino et al. (1996); Ohimiya et al., (1987)], and altered rennet coagulation of milk [Desobry-Banon et al., J. Dairy Sci., 77:3267–3274 (1994); Ohimiya et al. (1989)]. Pressures above 300 MPa increased cheese yields [Lopezfandino et al. (1996)].

In view of the potential risks to the functionality of rennet and starter cultures, steps in the processing of hard cheese that would subject these components to unusual conditions normally would not be contemplated.

SUMMARY OF THE INVENTION

We have now unexpectedly discovered that treatment of cheese milk with high pressure $CO_2$ can significantly accelerate the precipitation of casein from cheese milk without adverse affects on the rennet or starter culture.

In accordance with this discovery, it is an object of this invention to shorten the processing time for the manufacture of hard cheese by the application of high pressure carbon dioxide to "cheese milk", inoculated with starter culture and rennet.

Specifically, it is an object of the invention to substantially reduce the time that is currently required to set, cut, cook, and drain curd in the manufacture of hard cheeses.

It is also an object of the invention to compress the period for curdling of cheese milk with high pressure $CO_2$ without significant loss of functionality in either the starter culture or the rennet.

Another object of the invention is to significantly increase the daily curd yields and plant throughput in the manufacture of hard cheeses, thereby reducing processing costs per pound of cheese.

Still another advantage to this invention is enhancement of the nutritional quality of hard cheeses by improvement of the retention of calcium in the curd.

Other objects and advantages of the invention will become readily apparent from the ensuing description.

DETAILED DESCRIPTION OF THE INVENTION

Figure 1:
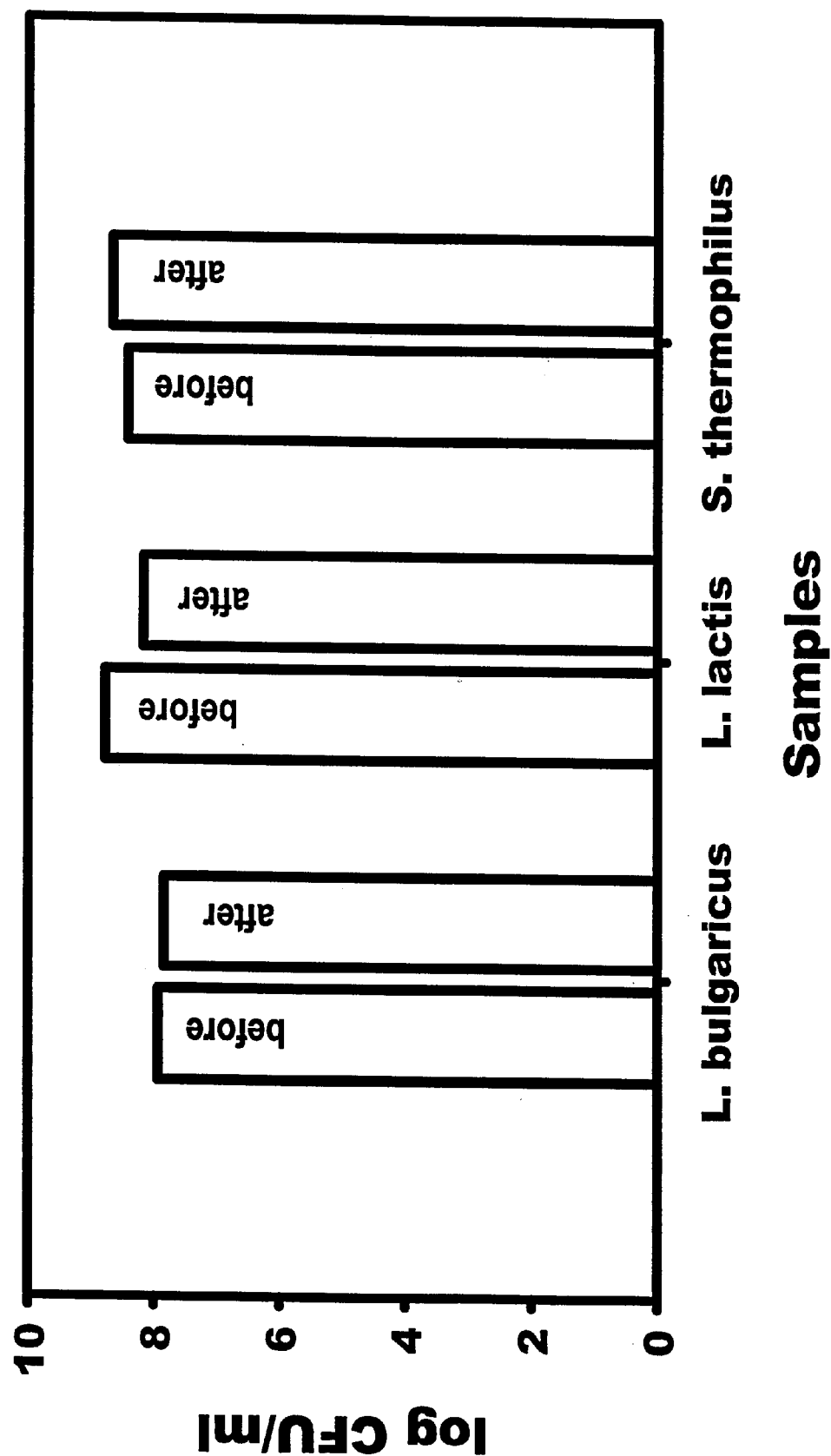
FIG. 1 is a histogram comparing the levels of three starter cultures, L. bulgaricus, L. lactis, and S. thermophilus in broths, before and after processing with high pressure $CO_2$.
Figure 2:
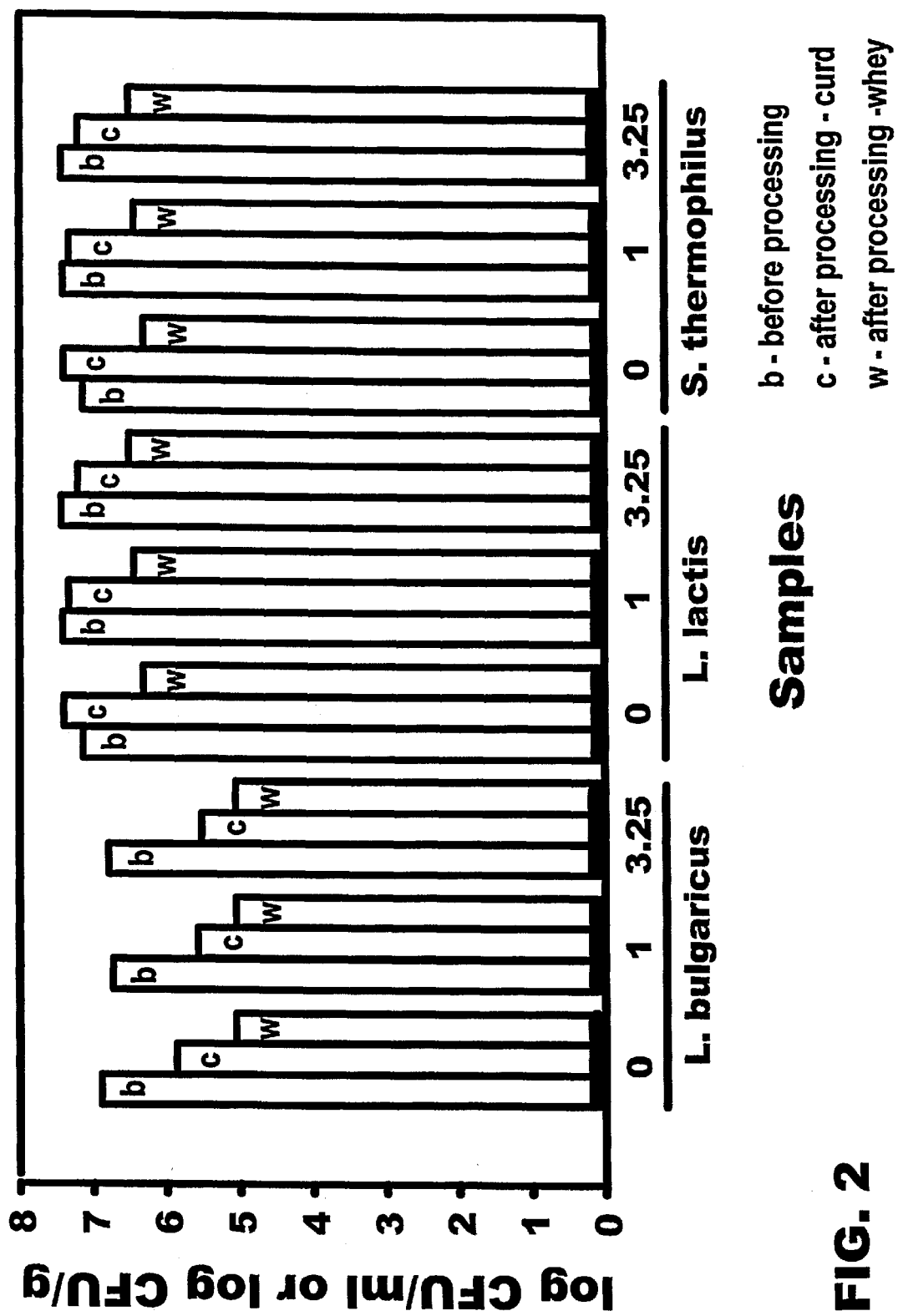
FIG. 2 is a histogram comparing the levels of three starter cultures, L. bulgaricus, L. lactis, and S. thermophilus, in cheese milk before processing with high pressure $CO_2$ and in the resulting curd and whey after processing with high pressure $CO_2$.

The term "hard cheese" as used herein is in accord with the established definition; that is a whole milk cheese having 49–55% water in fat free substance and $\geq$45–<60% fat in dry matter. More particularly, the invention relates to cheeses having an overall moisture content in the range of 20–42%, and made by the medium scald process (cooking at temperatures in the range of about 35–40° C. Examples of hard cheeses contemplated herein, but without limitation thereto, include Cheddar, Brick, Manchego, Dunlop, and the like, as well as the Hispanic cheeses, including Hacienda, Pamela, and Oaxaca. Once the curd is made using medium scald temperatures and the pressure is released, the curd can be cooked at higher temperatures to produce hard scald cheese of similar moisture (20–42%). Hard scald cheeses (40–55° C.) include Provolone, Romano and Swiss.

The milks, rennets, and starter cultures conventionally used in the making of hard cheeses are formulated in accordance with established recipes as known in the art.

Prior to inoculation, the milk is typically pasteurized to reduce pathogens and to provide a more favorable environment for the starter culture. Fat contents of the milk may vary from zero percent (skim) to approximately 3.2% (whole), though it is envisioned that the process of the invention would also apply to milks modified to have a higher than normal fat content. Cheese milk can also be made from reconstituted nonfat dry milk or milk fortified with extra milk solids.

The invention is contemplated to be applicable to any of the starter cultures conventionally used in making hard cheese. Exemplary of such cultures, without limitation thereto, are Lactobacillus delbrueckii ssp. bulgaricus (L. bulgaricus), Lactococcus lactis ssp. lactis (L. lactis), and Streptococcus thermophilus (S. thermophilus). Inoculation levels will be in the range of about $10^7$ to $10^{12}$ colony forming units (CFU)/mL, and more typically in the range of $10^8$ to $10^{10}$ CFU/mL. These are inoculation levels conventionally used in the cheesemaking process, and can be adjusted higher or lower as necessary.

The rennet for use herein may be from any conventional source, and is inclusive of commercial rennets commonly used in cheese manufacture. They may be of animal, vegetable or microbial origin. As previously stated, the principal enzymes in rennet of interest to cheese-making are rennin (chymosin) and pepsin. These enzymes are responsible for hydrolyzing casein to peptides such as $\alpha_{s1}$I and $\beta$-I casein during ripening.

The $CO_2$ treatment of this invention is applied to the mixture of cheese milk and starter culture, with rennet added just prior to $CO_2$ treatment. The treatment may be in a batch or a continuous operation. The level of $CO_2$ addition should be sufficient to reduce the pH from near neutral (pH 6.5–pH 7.5), usually about pH 6.7–pH 7.2, to a point at which the casein precipitates within a period of about 1–10 minutes, and preferably within the period of 1–5 minutes. The majority of the precipitation occurs within the first minute. Holding times longer than 10 minutes may be employed without detriment to the curd, but with little or no advantage in terms of curd formation. For effective formation and separation of the curd, it is usually desired to reduce the pH to about pH 5.7 or less, and preferably within the range of about 5.0 to 5.7. The reduction in pH is attributed to the release of H+ as $CO_2$ dissolves in the milk.

During the $CO_2$ treatment, a wide range of temperature and pressure combinations are possible to obtain acceptable moisture in the resulting curds. Temperatures may range from 22–60° C. and pressures from 2.8–9 MPa (400–1300 psi). The preferred treatment is within the range of 35–400° C. and $CO_2$ pressures in the range of 4–5.7 MPa (600–825 psi); the ideal treatment is about 38° C. and pressures of 5.5–5.7 MPa (800–825 psi). If the pressure is maintained at 5.7 MPa (800 psi) and the cheese milk is warmed to above 40° C., undesired cooking of the milk mixture begins before the curd is formed. Below 30° C., casein precipitation is reduced and separation between the curd and whey is insufficient. At 32° C., curd forms, but may be excessively watery and slushy.

Alternate $CO_2$ treatments can be used such as 1) decreasing the cheese milk temperature to as low as 22° C. and increasing the pressure up to 1300 psi or 2) increasing the temperature up to 60° C. and lowering the pressure to 400 psi. Temperatures above 35° C. are preferred because butterfat, which melts between 28–33° C., is liquid and flowing and ensures better distribution. Temperatures near 60° C. are usually not desired because of the denaturation of whey proteins and the formation of complexes between whey proteins and caseins. Curd moisture can be tailored initially using a selected temperature/pressure treatment or can be altered post treatment by cooking the curd at higher temperatures.

We have discovered that the aforementioned temperature and pressure are not only effective in the rapid precipitation of the curd, but also in yielding a curd with the critical amount of moisture required for development of the proper texture in the aging process. At too high a moisture content, the curd would not have the proper handling characteristics for the remainder of the manufacturing process; and at too low a moisture content, the cheese would tend to be more crumbly than desired.

Another surprising discovery was that the high pressure did not interfere with the calcium retained in the curd. Prior to the experimental work described in the Examples, below, it was not known if the $CO_2$ treatment would shift the equilibrium of the calcium between the casein miscelle and into the whey fraction.

In a batch treatment, a reactor fitted with a temperature controller, stirring device and a $CO_2$ sparger is loaded with a measured amount each of milk, the starter culture inoculum, and rennet. Alternatively, the milk may be pre-inoculated with the starter culture and incubated for a predetermined period to establish the culture in the milk medium. The milk is then stirred while prewarmimg to the desired processing temperature. The $CO_2$ is sparged into the sealed container until the predetermined pressure is attained, and the pressure is held for the requisite period, as discussed above. During the brief holding period, the $CO_2$ is dissolved in the aqueous phase of the milk. Upon release of the pressure, the majority of the $CO_2$ is vented from the chamber and the majority of the whey is drained from the vessel. The resultant curd is removed from the vessel to cheese cloth or a suitable filter to drain excess whey.

Alternatively, the high pressure $CO_2$ treatment may be conducted in a continuous reactor as described by Tomasula in U.S. Pat. No. 5,432,265 herein incorporated by reference. In the continuous reactor, the inoculated milk being pumped through a check valve from a feed tank is agitated by pressurized gaseous or liquified $CO_2$ entering the reactor through a manifold. Liquid contact and agitation can be maximized by introducing the $CO_2$ through a manifold and passing the mixture through an in-line static mixer. The mixture may be further treated in an optional holding tube and/or a heating/cooling section as required to maintain the proper reaction conditions as discussed above. The continuous system of Tomasula '265 utilizes a high-pressure pump operated in reverse to maintain a high pressure in the reactor and to gradually return the treated milk to atmospheric pressure at the exit line.

EXAMPLES

A study was undertaken to determine the survival and acid production capabilities of a representative cross-section of starter cultures, including *Lactobacillus delbrueckii* ssp. *bulgaricus* (*L. bulgaricus*), *Lactococcus lactis* ssp. *lactis* (*L. lactis*), and *Streptococcus thermophilus* (*S. thermophilus*) when $CO_2$ was sparged into growth broth or into milk containing 0, 1, or 3.25% fat and then held for 5 min at approximately 38° C. at 5.52 MPa. The thermophilic *L. bulgaricus* produces acid and flavor in buttermilk, yogurt, and Swiss and Italian cheeses. *S. thermophilus* is also thermophilic and is used in yogurt and Cheddar and Italian cheeses. The *L. lactis*, which is more temperature sensitive, is used in buttermilk, sour cream, cottage cheese, and many varieties of domestic and foreign cheeses. Media inoculated with the starter cultures were subjected to $CO_2$ processing to determine the effect of the $CO_2$ treatment on the survival of the starter cultures.

All broth and milk samples were incubated for 3 h after inoculation to allow for sufficient recovery and growth of the microorganisms in their new environment. This resulted in each sample having different initial starting pH and CFU.
Starter Cultures Frozen (−60° C.) cheese starter cultures, *L. bulgaricus* ATCC #11842, *L. lactis* ATCC #11955, and *S. thermophilus* ATCC #19258 were used in the following examples.
Media

*L. bulgaris* was maintained and processed in Lactobacilli MRS broth (MRS)(Difco Laboratories, Detroit, Mich.). *L. lacti* and *S. thermophilus* were maintained and processed in tryptone yeast lactose (TYL) broth containing tryptone, yeast, beef extract (Difco), lactose, and $K_2HPO_4$ (J. T. Baker, Phillipsburg, N.Y.). Plate counts were determined on appropriate broth containing 1% Bacto agar (Difco). Samples were diluted in deionized distilled water containing 1% Bacto peptone (Difco).
Equipment A 4521 316SS Parr reactor (Parr Instrument Co., Moline, IL) with a 1-L capacity was modified as described by Tomasula et al. [*J. Dairy Sci.* 78:506–514 (1995)], herein incorporated by reference. The lid of the chamber was fitted with a 3-blade propeller stirrer, a $CO_2$ sparger made of a modified 2-μm porous metal filter (Supelco, Inc., Belfonte, Pa.) on a 0.6-cm tube, and a metal filter frame fitted with a piece of silk. The chamber could be tilted and its height adjusted to allow the chamber to be filled and then raised to seal and secure the lid for pressurization.
Processing Before each sample was processed, the sparger and stirrer were removed and the $CO_2$ chamber and inlet and outlet lines were rinsed with the sanitizer and then purged with steam for 30 min. The sparger was flamed to remove all particulate material. The sparger, stirrer, and silk filter were sanitized before being reinserted into the chamber.
Statistical Analysis Processing trials were scheduled and analyzed using a split-plot experimental design. Milk or broth was blocked randomly for each processing day within a 4 processing day grouping and each of the three starter cultures randomly ordered for each processing day. Triplicate processing days were scheduled for a total of 12 processing days and a total of 36 trials. The *S. thermophilus* broth CFU means were the only means based on duplicate rather than triplicate trials. Controls consisted of trials using uninoculated milk. Broth data were analyzed separately from the milk data. General linear model (GLM) statistical analysis was used to evaluate pH and microbiological responses. Data from milk trials were evaluated using both whole plot and subplot analysis.

Example 1

Inoculation

Aliquots (0.1 ml) of stock cultures were transferred to 20 ml of either tryptone yeast lactose (TYL) or MRS broths and incubated for at least 16 h at either 30° C. (for *L. lactis*) or 37° C. (for *L. bulgaricus* or *S. therimophilus*). These cultures were used to inoculate 500 ml of either TYL or MRS broths. Inoculated broths were incubated for 3 h at the appropriate temperature with shaking (100 RPM) before processing. Samples (20 ml) of the inoculated broth were aseptically removed at 0 and 3 h and immediately after processing and used to determine pH and the number of CFU.

On each processing day, 3 processing trials were conducted with each trial containing a different cheese starter culture (*L. bulgaricus*, *L. lactis*, or *S. thermophilus*). The *L. lactis* and *S. thermophilus* were processed in TYL broth and the *L. bulgaricus* was processed in MRS broth.
Processing Parameters Approximately 440 ml of inoculated sample were placed in the batch chamber and prewarmed to approximately 38° C. Temperature variation (±1.4° C.) was due to the introduction of chilled $CO_2$ into the chamber. The sample was stirred during prewarming and also for the first 4 min of processing to ensure adequate mixing. Chilled $CO_2$ was slowly sparged into the chamber and usually required under 2 min. to reach the processing pressure. Processing conditions approximating 5.52 MPa and 38° C. were held for 5 min. before pressure was released. Mean conditions for the triplicate runs of each trial are reported in Table 1.

The liquid TYL or MRS broth was collected through the outlet line.

Changes in pH

Decreases in the pH of broth samples (Table 2) were potentially attributed to either starter culture production of lactic acid or to $CO_2$ dissolved into the sample during processing. Before inoculation, both buffered TYL and MRS broth had pH values of 6.5, while after inoculation and a 3 hr incubation, sufficient lactic acid was produced to lower the pH of *L. bulgaricus, L. lactis*, and *S. thermophilus* samples to 5.73, 6.03, and 6.22, respectively. After processing, the pH had decreased to 5.43, 5.63, and 5.69, respectively. Initial studies (not shown) indicated that this drop in broth pH was due to the introduction of $CO_2$ into the sample during processing and not due to the production of lactic acid by the starter culture during the 10 to 15 minutes required to process the sample.

CFU

Actual count of the starter culture microorganisms, before and after processing are reported as log CFU/ml (FIG. 1).

General linear model analysis of the CFU data indicated that there were more variations among the replications than among the starter cultures. Broth inoculated with *L. bulgaricus, L. lactis*, and *S. thermophilus* had log CFU/ml of 7.93, 8.78, or 8.42 prior to processing and log CFU/ml of 7.84, 8.16, or 8.66 after processing, respectively.

Example 2

Inoculation

The procedure of Example 1 was repeated, except the high pressure $CO_2$ treatment was applied to milk samples of varying fat content pretreated with the same *L. lactis, L. bulgaricus* and *S. thermophilus* starter cultures. Modifications made to the process described in Example 1 for the purpose of treating the milk samples are noted below.

Aliquots (0.1 ml) of stock cultures were transferred to 20 ml of ultra high temperature (UHT) treated skim milk (Parmalat Moonacheie, NJ) incubated for at least 16 h at either 30° C. (for *L. lactis*) or 37° C. (for *L. bulgaricus* or *S. thermophilus*), and used to inoculate 500 ml of nonhomogenized milk containing 0, 1, or 3.25% fat. Fat content of the pasteurized nonhomogenized whole and skim milks, determined before inoculation using the Babcock assay, was used as the basis for standardizing milk to 1 and 3.25% fat. Inoculated milk samples were incubated for 3 h at the appropriate temperature with shaking (100 RPM) before processing. Samples (20 ml) of the inoculated milk were aseptically removed at 0 and 3 h and used to determine pH and the number of colony forming units (CFU).

After processing, the whey was removed through the outlet line, collected in a sterile container and placed on ice. After the chamber was opened, the casein curd was aseptically removed and placed into cheese cloth suspended within a sterile beaker to allow the excess whey to drain. The beaker was covered with aluminum foil and placed on ice. Within 15 min, 1 to 3 g of curd was removed for microbiological analysis. A portion of the drained curd was used to determine the pH at 0 d and the remainder was placed in a sterile container and incubated at 30° C. (for *L. lactis*) or 37° C. (for *L. bulgaricus* and *S. thermophilus*) for 2 d; curd pH was determined at 1 and 2 d. Mean processing conditions and mean amounts of curd and whey recovered for the triplicate samples for each treatment are given in Table 1.

Table 2 gives the pH values before and after processing. Before inoculation, milk samples had an average pH of 6.68, while after inoculation and a 3 h incubation, the milk was pH 6.59, 6.55, and 6.60, for *L. bulgaricus, L. lactis*, and *S. thermophilus*, respectively. Compared to the pH of milk before processing, the pH decreased to 6.23 to 6.24 in the whey and 5.61 to 5.65 in the casein curd. In the controls, (uninoculated milk), the pH also decreased from 6.68 to 6.13 in the whey and 5.78 in the curd. This supports the supposition that the drop in pH was due to the $CO_2$ processing and not due to the starter cultures.

Casein curds were incubated for 2 d at the starter culture's optimum temperature to determine if the microorganisms that had survived the $CO_2$ process were still capable of producing sufficient amounts of lactic acid to lower the pH of the curd. After 2 d of incubation, the pH of the curds inoculated with *L. bulgaricus, L. lactis*, and *S. thermophilus* had decreased to 4.53, 5.22 and 4.99, respectively. These data showed that milk inoculated with cheese starter cultures and treated with $CO_2$ under high pressure to precipitate casein produced curds that contained sufficient numbers of viable starter culture to continue lowering the curd pH. Of all the pH data, the only significant differences ($P<0.05$) among the starter cultures were found for curds after 2 d of incubation.

Curd development

Treatment of fluid milk with $CO_2$ under high pressure precipitated casein and resulted in a good separation and recovery of curds and whey (Table 1). Small amounts of fines were visible in the whey and only faint whey protein bands were found in SDS PAGE of the curds (data not shown). Based on skim milk containing an average of 2.6% casein and assuming the curds had 80% moisture as reported by Tomasula et al. [*J. Dairy Sci.* 78:506–514 (1995)], the actual yield *L. bulgaricus, L. lactis* and *S. thermophilus*, respectively of the curd from the $CO_2$ chamber was 80%, 80%, and 58% of the estimated yield. The curds appeared to be drier as the fat content decreased. Curds from milk inoculated with *L. bulgaricus* were firmer than those inoculated with other starter cultures, with *L. lactis* curds being the softest. At d zero, curds had very faint cheesy odors that increased over the 2 d of incubation and with each starter culture having its own distinct odor. Whey continued to drain from the curd during the first 24 h.

CFU

Split-plot analysis of the CFU data indicated that there were significant differences among the three starter cultures, but not for the different levels of fat in milk. Milk (average of all fat levels) inoculated with *L. bulgaricus, L. lactis*, and *S. thermophilus* had log CFU/ml of 6.81, 7.35, and 6.75 before processing and log CFU/ml of 5.05, 6.43, and 6.14 for the whey and 5.68, 7.32, and 6.55 for the curd, respectively (FIG. 1). The curds contained a higher concentration of log CFU/g than the whey. The *L. bulgaricus* samples tended to show the largest reduction in log CFU due to processing.

Example 3

This example was designed to determine how much rennet activity remained in the cheese curd after the cheese milk had been processed using carbon dioxide under high pressure.

An aliquot (0.1) of a commercial cheese starter culture containing *L. cremoris* (CS28), Marschall brand, Miles Inc., Madison, Wis.) was added to 20 ml of UHT skim milk and incubated at 30° C. overnight. The entire inoculum was added to 760 ml of milk containing either 0% fat (Run #2) or 1% fat (Run #1) and incubated for 3 hours at 30° C. with shaking. Commercial rennet (Chris Hansen Laboratories, Milwaukee, Wis.) was diluted (0.13 ml of single strength rennet in 5.5 ml water) and gently mixed into the milk. Aliquots (20 ml) of milk were taken just before (control) and just after the rennet was added (zero time) and immediately frozen and lyophilized.

Milk containing the starter culture and rennet was transferred to the vessel and processed as in Example 2 (warmed to 38° C., sparged with $CO_2$ to obtain 5.52 MP, and held for 5 min). After processing, curd was removed from the vessel to cheese cloth to drain excess whey, transferred to a sterile container, and stored at 4° C. Within 10 days, 2 g of curd was removed, homogenized in 12 ml of deionized distilled water, centrifuged at 18,000 rpm for 35 min at 4° C., and filtered through Whatman® #1 filter paper. The filtered water extract was frozen and lyophilized.

A standard curve was prepared in order to determine the clotting time of skim milk samples treated with known quantities of rennet. A 10 mg portion of the lyophilized milk and rennet and curd water extract were dissolved in skim milk at pH 6 and 30° C. Clotting time of the curd water extracts was used to determine the quantity of active rennet and was compared to rennet in zero time milk and rennet.

| Run # | Sample | Activity (%) |
|---|---|---|
| 1 | milk + rennet | 100 |
| 1 | curd extract | 15 |
| 2 | milk + rennet | 100 |
| 2 | curd extract | 4 |

After the high pressure $CO_2$ treatment, the cheese curd extracts still contained between 4 and 15% rennet activity. Based on reports in the literature (Farkye, N. Y. 1995. Contribution of milk-clotting enzymes and plasmin to cheese ripening. Page 195, in Chemistry of Structural-Function Relationships in Cheese. E. L. Malin and M. H. Tunick, eds. Plenum Press, NY. Farkye, 1995), usually less than 10% of the rennet activity remains in the cheese. Therefore, the amounts of rennet observed in this experiment are deemed sufficient to promote the further proteolysis of the milk proteins to develop the flavor, aroma, and texture during aging.

Example 4

The survival of rennet after $CO_2$ precipitation of casein in milk containing *Lactococcus lactis* spp. cremoris was determined as a function of the appearance of casein peptides in SDS-PAGE gels. Milk samples were processed with high pressure $CO_2$ and curd collected for storage at 4° C. as described in Example 3 in duplicate trials.

After six weeks of storage, 2 g of curd was homogenized in 12 ml of buffer containing 0.07 mM Tris, 0.4 mM EDTA, 3% SDS, and 2 mM DTT for a total of 20 minutes, centrifuged at 18,000 rpm at 4° C. for 60 minutes, and filtered through Whatman #1 filter paper. The filtered SDS extract was frozen and lyophilized.

Approximately 1 mg of lyophilized samples (control, 0 time, and SDS extract) were dissolved in 0.1 ml of buffer containing 0.06 mM Tris, 0.5 mM EDTA, 3.5% SDS and 10% mercaptoethanol, and heated at its boiling point for 5 min. Samples were placed on a 20% homogeneous gel and SDS-PAGE was used to separate proteins into individual bands (results not shown). The gel was stained with Coomassie Blue and the protein profiles of the samples were compared.

The lane for the total milk showed all caseins and two major whey proteins present in milk, in descending order of molecular mass: $\alpha_{s2}$-casein, $\alpha_{s1}$-casein, $\beta$-casein, $\kappa$-casein, $\beta$-lactoglobulin (β-LG) and $\alpha$-lactalbumin ($\alpha$-LA).

Lanes for the duplicate samples of milk containing *L. lactis* ssp. *cremoris* showed the four caseins, as well as a small amount of β-LG. Lanes for the duplicate samples of milk containing *L. lactis* ssp. *cremoris* and rennet (chymosin), (samples shell frozen and lyophilized immediately after addition of rennet), were similar, but also have very minor bands of para-κ-casein, indicating a small amount of κ-casein cleavage by rennet that occurred when the rennet was added to the milk.

Lanes for the duplicate samples of precipitated curd extracted with SDS-buffer at six weeks showed that rennet survived the $CO_2$ precipitation and was active against all of the κ-casein, as no κ-casein bands could be observed. Bands of para-κ-casein were clearly visible. In addition, the density of the $\alpha_{s1}$-casein bands was decreased, and new, more intense bands of $\alpha_{s1}$-I-casein were observed between the aSI-casein and β-casein bands. In one of the duplicate samples, most of the $\alpha_{s1}$-casein had been converted to $\alpha_{s1}$-I-casein. Because the new bands result from the removal of residues 1–23 of $\alpha_{s1}$-casein by rennet during storage of the curds, survival of active rennet during the processing step is confirmed.

In the lanes associated with the precipitated curd extracted with SDS-buffer at six weeks, bands located below β-casein bands could not be identified, as they have not been observed before on SDS gels. One possibility is that they could be large β-casein fragments from residues removed by the action of a $P_I$-type cell-wall-associated proteinase of *L. lactis* ssp. *cremoris*. The predicted molecular mass of residues 7–209 of β-casein is 23,340 and that of residues 7–193 is 21,350. The molecular mass of the parent is 23,980, and the molecular mass of residues 29–209 of β-casein ($\gamma_I$-casein), is 20,520. The cell-wall-associated proteinases are not secreted, but under the conditions used for $CO_2$ precipitation some cells of *L. lactis* ssp. *cremoris* could have ruptured, releasing their enzymes to the system.

It is to be understood that while the invention has been described above in conjunction with preferred specific embodiments, the description and examples are intended to illustrate and not limit the scope of the invention, which is defined by the scope of the appended claims.

TABLE 1

Summary of processing parameters and recovery of whey and curd for *L. bulgaricus*, *L. lactis*, and *S. thermophilus* inoculated samples

|  | *L. bulgaricus* Mean | *L. lactis* Mean | *S. thermophilus* Mean |
|---|---|---|---|
| Processing Parameters | | | |
| Broth | | | |
| Temperature | 37.5[a] | 38.7[a] | 37.4[a] |
| Pressure, MPa | 5.58[a] | 5.53[a] | 5.67[a] |
| Milk | | | |
| Temperature | 38.1[a] | 38.1[a] | 38.6[a] |
| Pressure, MPa | 5.60[a] | 5.56[a] | 5.58[a] |
| Recovery, from milk | | | |
| Curd, g | | | |
| 0% fat | 46.7[b] | 46.2 | 45.0[b] |
| 1% fat | 67.8[a] | 61.7 | 57.3[ab] |
| 3.25% fat | 70.7[a] | 75.0 | 75.0[a] |

TABLE 1-continued

Summary of processing parameters and recovery of whey and curd for L. bulgaricus, L. lactis, and S. thermophilus inoculated samples

| | L. bulgaricus Mean | L. lactis Mean | S. thermophilus Mean |
|---|---|---|---|
| Whey, ml | | | |
| 0% fat | 379[a] | 375[a] | 391[a] |
| 1% fat | 365[a] | 375[a] | 379[a] |
| 3.25% fat | 374[a] | 365[a] | 371[a] |

[a,b]For processing data, means in the same row with different letters are significantly ($P < 0.05$) different. For recovery data, means within either whey or curd that have different letters are significantly ($P < 0.05$) different.

TABLE 2

Summary of the pH of broth and milk samples inoculated with L. bulgaricus, L. lactis, and S. thermophilus

| | L. bulgaricus | | L. lactis | | S. thermophilus | | Control (Uninoculated) | |
|---|---|---|---|---|---|---|---|---|
| | Mean | SD | Mean | SD | Mean | SD | Mean | SD |
| Broth | | | | | | | | |
| Before processing | 5.73[a] | 0.51 | 6.03[a] | 0.27 | 6.22[a] | 0.35 | 6.50 | 0.04 |
| After processing | 5.43[a] | 0.31 | 5.63[a] | 0.16 | 5.69[a] | 0.33 | 6.09 | 0.04 |
| Milk | | | | | | | | |
| Before processing | 6.59[a] | 0.05 | 6.55[b] | 0.04 | 6.60[a] | 0.04 | 6.68 | 0.03 |
| After processing | | | | | | | | |
| Casein curd | | | | | | | | |
| 0 d | 5.65[b] | 0.07 | 5.62[a] | 0.04 | 5.61[a] | 0.16 | 5.78 | 0.01 |
| 1 d | 4.94[a] | 0.29 | 5.40[a] | 0.09 | 5.10[b] | 0.15 | 5.64 | 0.07 |
| 2 d | 4.53[a] | 0.11 | 5.22[a] | 0.11 | 4.99[b] | 0.21 | 5.41 | 0.04 |
| Whey | 6.24[a] | 0.04 | 6.23[a] | 0.03 | 6.23[a] | 0.06 | 6.13 | 0.08 |

[a,b]Means on the same row with different letters are significantly ($P < 0.05$) different.

We claim:

1. In the manufacture of hard cheese, a method for accelerating the precipitation of casein from cheese milk having a starter culture as a component thereof, the improvement comprising treating said milk with carbon dioxide under conditions sufficient to precipitate said casein from the milk.

2. The method of claim 1, wherein said cheese milk also contains rennet.

3. The method of claim 1, wherein the treating of said milk with carbon dioxide is at a pressure within the range of 2.8–9 MPa.

4. The method of claim 1, wherein the treating of said milk with carbon dioxide is at a pressure within the range of 5.5–5.7 MPa.

5. The method of claim 1, wherein the starter culture is selected from the group consisting of *Lactobacillus bulgaricus, Lactobacillus lactis* and *Streptococcus thermophilus*.

6. The method of claim 1, wherein the starter culture is *Streptococcus thermophilus* and the hard cheese is Cheddar cheese.

7. The method of claim 1 wherein the conditions of treating said milk with carbon dioxide are sufficient to yield a pH of 5.7 or less.

8. The method of claim 1 wherein said treating with carbon dioxide is in a batch operation.

9. The method of claim 1 wherein said treating with carbon dioxide is in a continuous operation.

* * * * *